(12) United States Patent
Shibata

(10) Patent No.: US 7,397,021 B2
(45) Date of Patent: Jul. 8, 2008

(54) DEVICE HAVING OPTICAL SENSOR

(75) Inventor: Shinji Shibata, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 109 days.

(21) Appl. No.: 11/300,269

(22) Filed: Dec. 15, 2005

(65) Prior Publication Data

US 2006/0151678 A1 Jul. 13, 2006

(30) Foreign Application Priority Data

Jan. 11, 2005 (JP) ............................. 2005-003848

(51) Int. Cl.
*H01J 7/24* (2006.01)
(52) U.S. Cl. .................... 250/238; 250/214 R
(58) Field of Classification Search ................ 250/205, 250/238, 214 AL, 214 R, 214 D; 345/207, 345/101, 102
See application file for complete search history.

(56) References Cited

U.S. PATENT DOCUMENTS 5,382,941 A * 1/1995 Arzoumanian ......... 340/426.23
5,971,597 A * 10/1999 Baldwin et al. ............ 700/277
6,552,332 B2 * 4/2003 Kusaka et al. ............... 250/238
2003/0144783 A1 * 7/2003 Drummond et al. ........... 701/49
2003/0230991 A1   12/2003 Muthu et al.
2004/0069929 A1 * 4/2004 Furukawa et al. ......... 250/208.1
2004/0130789 A1 * 7/2004 Bechtel et al. .............. 359/604
2005/0212824 A1 * 9/2005 Marcinkiewicz et al. .... 345/690

FOREIGN PATENT DOCUMENTS

| DE | 199 35 458 A1 | 2/2001 |
| JP | U-63-51469 | 4/1988 |
| JP | A-9-80579 | 3/1997 |
| JP | A-11-316566 | 11/1999 |

* cited by examiner

*Primary Examiner*—Georgia Y. Epps
*Assistant Examiner*—Kevin Wyatt
(74) *Attorney, Agent, or Firm*—Posz Law Group, PLC

(57) ABSTRACT

A functional device includes a light sensor for outputting a signal control signal relative to received light, a temperature sensor for outputting an additional control signal relative to an ambient temperature, a control means for controlling the signal control signal, and an output means for outputting a sensory signal perceivable by a sensory organ based on the signal control signal. The control means controls the signal control signal by using the additional control signal.

6 Claims, 3 Drawing Sheets

DEVICE HAVING OPTICAL SENSOR

CROSS REFERENCE TO RELATED APPLICATION

This application is based on and claims the benefit of priority of Japanese Patent Application No. 2005-3848 filed on Jan. 11, 2005, the disclosure of which is incorporated herein by reference.

FIELD OF THE INVENTION

The present invention generally relates to a device having an optical sensor.

BACKGROUND OF THE INVENTION

In recent years, a display device such as a liquid crystal display used for map display in a car navigation system includes an optical sensor for adjusting brightness of a backlight in the display. The brightness of the backlight is controlled to be dimmer when the vehicle is in a dark place, or to be brighter when the vehicle is in a very well-lighted place. In this manner, glaring or darkness of map display in the liquid crystal display is prevented. Japanese patent document JP-A-H11-316566 discloses a liquid crystal display having above-described control of brightness.

The optical sensor such as a photo diode or the like has an output characteristic that is susceptible to temperature of an environment. That is, the optical sensor receiving the same brightness outputs a different amount of output current when the temperature of the environment is different. As a result, the brightness of the liquid crystal display may be too bright or too dim for a driver of the vehicle when the output current from the optical sensor is changed because of the temperature of the environment.

Similar problems are experienced when the optical sensor is used in other kinds of devices. For example, a cellular phone having brightness detecting function for controlling volume of a ring tone does not work properly when the optical sensor does not distinguish the brightness in a pocket from the brightness in a bag because of the output characteristic under the influence of the temperature. That is, the volume of the ring tone does not change for drawing attention of a user even when the cellular phone is stored in the bag.

SUMMARY OF THE INVENTION

In view of the above-described and other problems, the present invention provides a device having an optical sensor for controlling an output of the device suitably to the brightness of an environment.

The device of the present invention includes the optical sensor and a temperature sensor. An output signal of the optical sensor to the device is compensated for suitably controlling the device based on a temperature characteristic of the optical sensor and detected temperature by using a temperature compensation function.

For example, a backlight of a liquid crystal display is controlled based on a compensated output signal from the optical sensor by using a controlling scheme of the present invention. The scheme of the present invention can also be applicable to a device such as a sound generating device, or a vibration generating device. The output signal from the optical sensor after compensation of the temperature characteristic is used to control the sound output or the vibration output of those devices.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Figure 2:
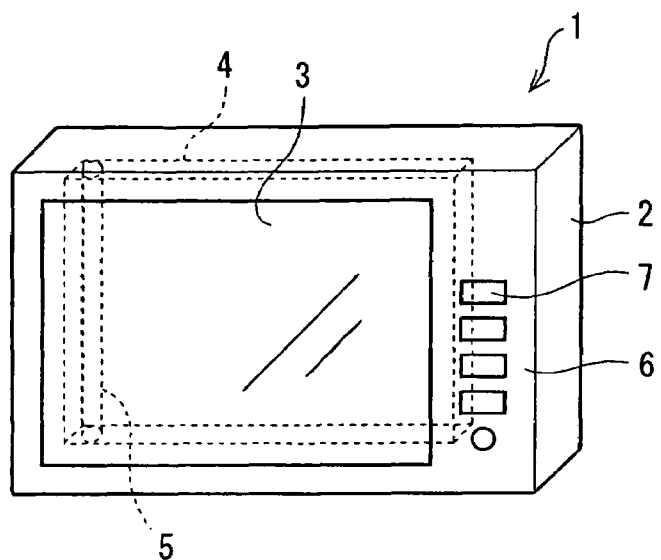
FIG. 2 shows a perspective view of the liquid crystal display device.

An embodiment of the present invention as a liquid crystal display of a car navigation system is described with reference to the drawings. The navigation system in the embodiment includes a liquid crystal display 1 for displaying a map or the like as shown in FIG. 2.

The liquid crystal display 1 includes a frame 2, a liquid crystal panel 3 in the frame 2, and a backlight unit 4 disposed on a rear side of he liquid crystal panel 3. The backlight unit 4 has a structure that is made up from a backlight such as a discharge lamp and a light guide panel (not shown in the figure). The discharge lamp may use a fluorescent lamp 5 or the like. The fluorescent lamp 5 emits light into the light guide panel from a side face and thereby evenly lights a rear side of the liquid crystal panel 3. The light from the rear side of the liquid crystal panel 3 clearly displays a content in the liquid crystal display 1.

Figure 3:
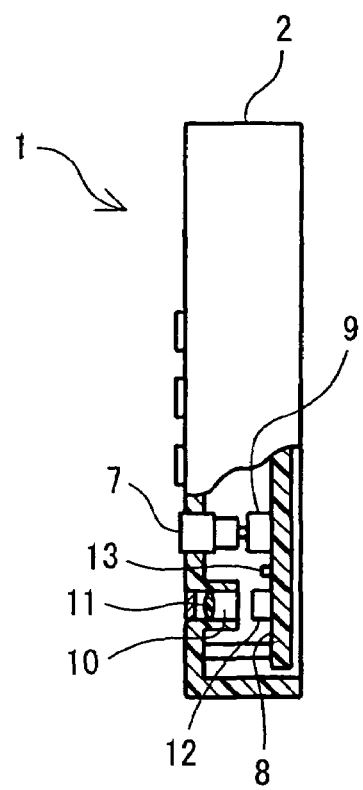
FIG. 3 shows a side view of the liquid crystal display device with a partial cross-sectional view.

The frame 2 has a portion that includes an operation panel 6. The operation panel 6 includes a plurality of operation keys 7 disposed therein. The operation panel 6 is paired with a substrate 8 that is on a corresponding position in the frame 2 as shown in FIG. 3. The substrate 8 has switches 9 that are connected to the operation keys 7 in the operation panel 6.

The operation panel 6 also has a hole 10 for introducing light from an outside of the frame 2. The hole 10 has a collecting lens 11 disposed therein. The substrate 8 has an optical sensor 12 such as, for example, a photo diode for detecting brightness (intensity) of the light introduced therein. The optical sensor 12 is paired by a temperature sensor 13 having a positive temperature characteristic for detecting temperature of a space that surrounds the optical sensor 12.

Figure 1:
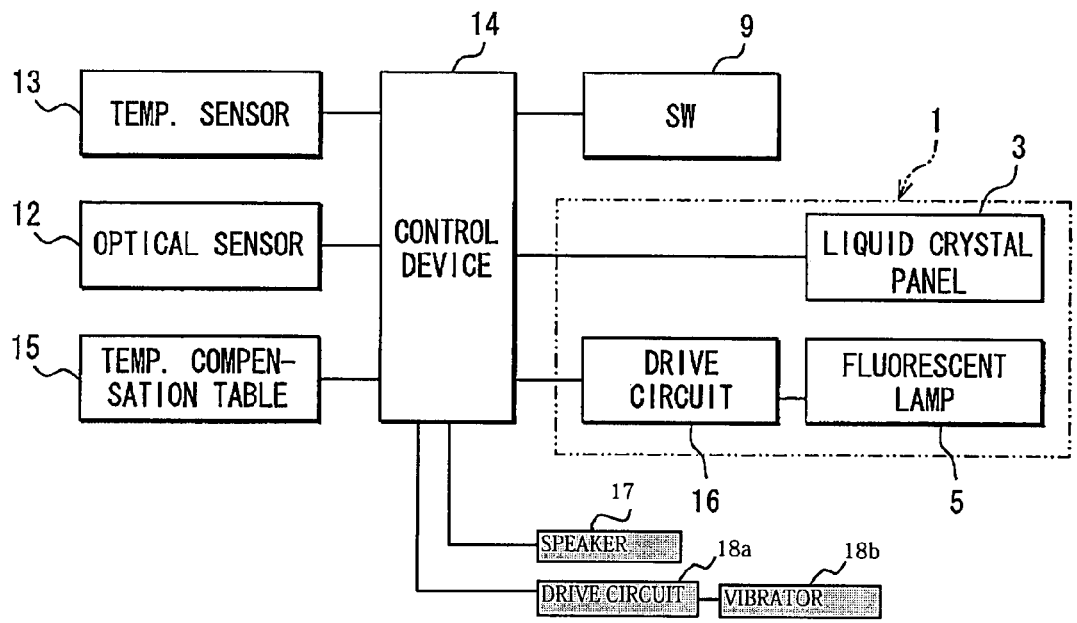
FIG. 1 shows a block diagram of a liquid crystal display device in an embodiment of the present invention.

FIG. 1 shows a block diagram of components in the liquid crystal display 1 in the present embodiment. A control device 14 in the display 1 is a microcomputer with accompanying circuits that includes a CPU, a RAM, a ROM and the like. The control device 14 is coupled with the liquid crystal panel 3, the switches 9, the optical sensor 9, the temperature sensor 13 as well as a temperature compensation table 15, and a drive circuit 16 of the fluorescent lamp 5. The control circuit 14 outputs a duty signal that is proportional to the intensity of illumination (brightness) detected by the optical sensor 12 to the drive circuit 16. The drive circuit 16 controls the brightness of the fluorescent lamp 5 based on the duty signal from the control device 14. The control device 14 can also provide a control signal to a speaker 17 to control a sound parameter of the speaker 17, or a control signal to a drive circuit 18a that controls a vibration parameter of a vibrator 18b.

The optical sensor 12 and the temperature sensor 13 respectively output analog signals based on the intensity of detected illumination and detected temperature. The analog signals of the detected illumination/temperature are converted to digital signals by an A/D converter (not shown in the figure) in the control device 14, and are used for calculation of compensation value of the illumination signal. The control device 14 merges the compensation value and digital signal for the detected illumination to output a compensated digital signal that represents the intensity of the illumination.

Figure 5:
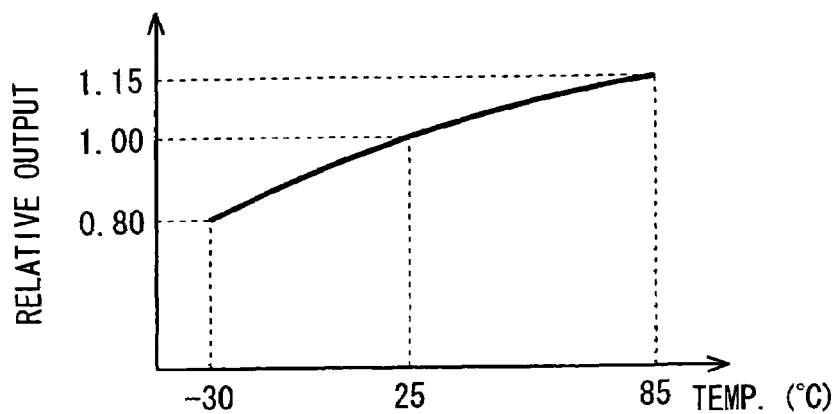
FIG. 5 shows a diagram of a relationship of a relative output against temperature in a photo diode.

FIG. 5 shows a diagram of a relationship of a relative output against temperature in a photo diode, i.e., the optical sensor 12. The relative output of the optical sensor 12 means a relationship of the output current of the optical sensor 12 against changing temperature with a reference current 1 at the temperature of 25° C. As seen in FIG. 5, the relative output of the optical sensor 12 is not linearly proportional to the temperature. Therefore, the duty signal proportional to the detected intensity of illumination from the optical sensor 12 does not appropriately control the brightness of the fluorescent lamp 5 as shown in FIG. 6B. That is, relative brightness of the liquid crystal panel 6 decreases as the temperature decreases.

The above-described situation means that the output current from the optical sensor 12 becomes lower than expected value when the temperature of the surrounding space of the sensor 12 is low. The decreased output current from the optical sensor 12 leads to a decreased brightness of the liquid crystal panel 3. A user of the navigation system may feel that the display 1 looks dark. The situation reverses when the temperature around the optical sensor 12 is high. That is, the display 1 may look glaring when the influence of the temperature on the optical sensor 12 is not compensated.

The compensation for temperature change is conducted according to a temperature characteristic of the optical sensor 12 shown in FIG. 5. That is, a compensation value (digital value) for each temperature is stored in the temperature compensation table 15 for use in a following equation 1 of compensation.

Compensated illumination value from the optical sensor 12=Detection value from the optical sensor 12+Compensation value   [Equation 1]

Figure 4:
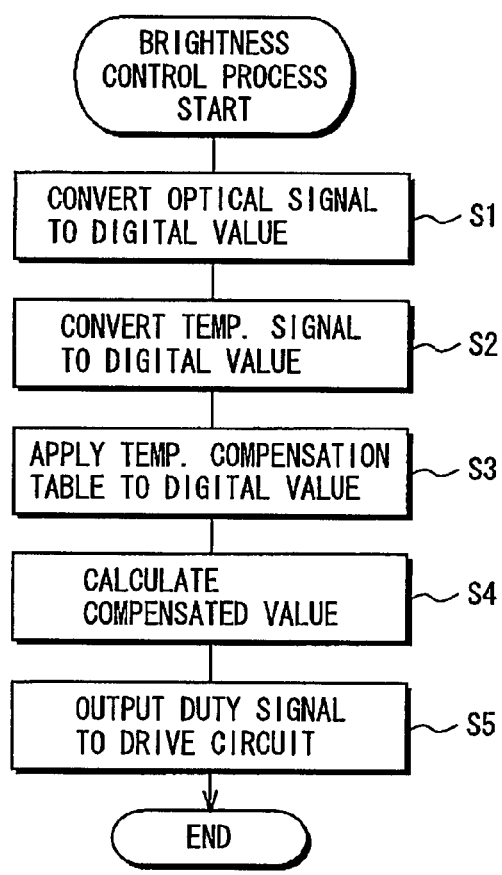
FIG. 4 shows a flowchart of a brightness control process.

A process for controlling the brightness of the fluorescent lamp 5 is shown in a flowchart in FIG. 4.

The brightness control process in the control device 14 starts with step S1 for retrieving a detection signal from the optical sensor 12 and converting it to a digital value by A/D conversion. A detection signal from the temperature sensor 13 is also converted to a digital value by A/D conversion in step S2. The process proceeds to step S3 for determining a compensation value for the detected temperature by searching the temperature compensation table 15.

The process calculates a compensated illumination value by substituting the compensation value in the equation 1 in step S4. The process outputs the duty signal based on the compensated illumination value to the drive circuit 16 in step S5 before returning to a main process. The drive circuit 16 controls the brightness of the fluorescent lamp 5 (i.e., the liquid crystal panel 3) based on the duty signal.

Figure 6A:
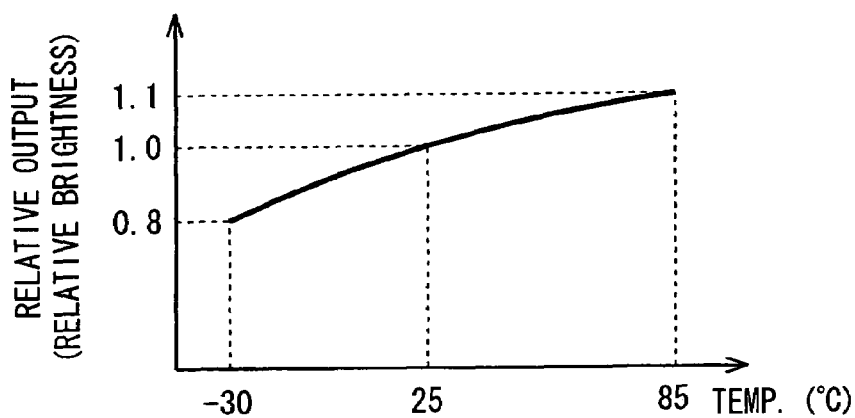
FIGS. 6a and 6b show diagrams of a relationship of a relative brightness against temperature in a liquid crystal panel.
Figure 6B:
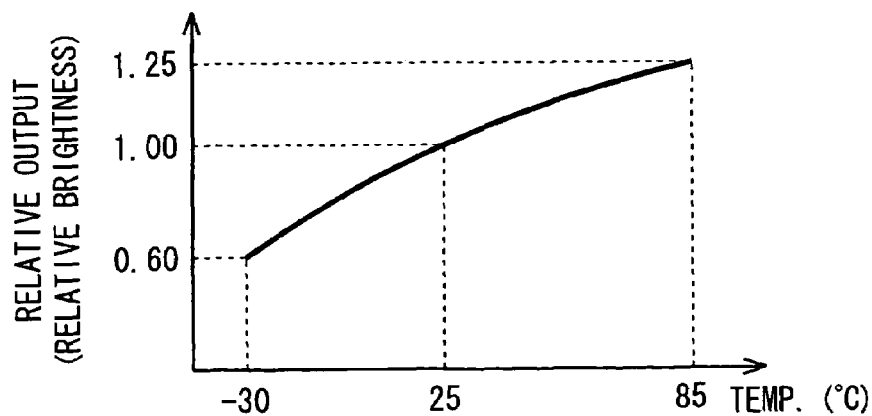

The liquid crystal display 1 of the present invention achieved a smaller variation of the relative brightness of the liquid crystal panel 3 against a same range of temperature by using the compensation value stored in the temperature compensation table 15 as shown in FIG. 6A. That is, the variation of the relative brightness of the panel 3 controlled by using the control process of the present invention decreases to be within a range of 0.8 to 1.1 against the range of the temperature of −30° C. to 85° C., compared to the range of 0.60 to 1.25 for the same temperature range as shown in FIG. 6B. In this manner, the brightness of the liquid crystal display 1 is more suitably controlled for the user in terms of suppressing glaringness/dimness.

Although the present invention has been fully described in connection with the preferred embodiment thereof with reference to the accompanying drawings, it is to be noted that various changes and modifications will become apparent to those skilled in the art.

For example, the compensated illumination value may be calculated directly substituting the detected temperature value in an equation, or the compensated illumination value may be stored in a table for directly reference from the detected temperature.

Further, the optical sensor 12 may be other type of sensor than the photo diode 12, and the temperature sensor 13 may be other type of sensor than a thermoelectric element having the positive temperature characteristic.

The position of the optical sensor 12 is not necessarily limited to a place on the substrate 8. The optical sensor 12 may be disposed at any place that is suitable for detecting the brightness of the space around the liquid crystal panel 3.

The liquid crystal display may be used in a place other than a vehicle.

The scheme of the present invention may be applicable for the devices such as a cellular phone or a projector. That is, the ring tone of the cellular phone (e.g., from a speaker 17 on the cellular phone) or the vibration of the cellular phone (e.g., from a vibrator 18b on the cellular phone) may be controlled according to the brightness of the environment for suitably drawing attention of the user when the cellular phone is stored either in a pocket of clothes or a bag. The brightness of the projector may be adjustably controlled according to the brightness around a screen.

The output of the device that is controlled by using the compensation scheme of the present invention may be any sensory signal that is perceptible by any sensory organ of the human being.

Such changes and modifications are to be understood as being within the scope of the present invention as defined by the appended claims.

What is claimed is:

1. A functional device comprising:
   a light sensor for outputting a signal control signal relative to received light;
   a temperature sensor for outputting an additional control signal relative to an ambient temperature;
   a control means for controlling the signal control signal; and
   an output means for outputting a sensory signal perceivable by a sensory organ based on the signal control signal,
   wherein the control means controls the signal control signal by using the additional control signal according to temperature-current characteristics of the light sensor at the ambient temperature,
   wherein the output means includes a backlight of a liquid crystal panel, and
   wherein the sensory signal includes light emitted from the backlight.

2. A functional device comprising:
   a light sensor for outputting a signal control signal relative to received light;

a temperature sensor for outputting an additional control signal relative to an ambient temperature;

a control means fur controlling the signal control signal; and an output means for outputting a sensory signal perceivable by a Sensory organ based on the signal control signal, wherein the control means controls the signal control signal by using the additional control signal according to temperature-current characteristics of the light sensor at the ambient temperature, wherein the output means includes a sound generation device, and wherein the sensory signal includes sound generated by the sound generation device.

3. A functional device comprising:

a light sensor for outputting a signal control signal relative to received light;

a temperature sensor for outputting an additional control signal relative to an ambient temperature;

a control means for controlling the signal control signal; and an output means for outputting a sensory signal perceivable by a sensory organ based on the signal control signal.

wherein the control means controls the signal control signal by using the additional control signal according to temperature-current characteristics of the light sensor at the ambient temperature, wherein the output means includes a vibration generation device, and wherein the sensory signal includes vibration generated by the vibration generation device.

4. A method for controlling a sensory signal comprising steps of:

providing a first sensor for outputting a signal control signal relative to received light;

providing a second sensor for outputting an additional control signal relative to an ambient temperature;

providing a control means for controlling the signal control signal; and providing an output means for outputting the sensory signal perceivably for a sensory organ based on the signal control signal, wherein the control means controls the signal control signal by using the additional control signal according to temperature-current characteristics of the first sensor at the ambient temperature, wherein the output means comprises a backlight of a liquid crystal panel, and wherein the sensory signal comprises light emitted from the backlight.

5. A method for controlling a sensory signal comprising steps of:

providing a first sensor for outputting a signal control signal relative to received light;

providing a second sensor for outputting an additional control signal relative to an ambient temperature;

providing a control means for controlling the signal control signal; and providing an output means for outputting the sensory signal perceivably for a sensory organ based on the signal control signal, wherein the control means controls the signal control signal by using the additional control signal according to temperature-current characteristics of the first sensor at the ambient temperature, wherein the output means comprises a sound generation device, and wherein the sensory signal comprises sound generated by the sound generation device.

6. A method for controlling a sensory signal comprising steps of:

providing a first sensor for outputting a signal control signal relative to received light;

providing a second sensor for outputting an additional control signal relative to an ambient temperature;

providing a control means for controlling the signal control signal; and providing an output means for outputting the sensory signal perceivably for a sensory organ based on the signal control signal, wherein the control means controls the signal control signal by using the additional control signal according to temperature-current characteristics of the first sensor at the ambient temperature, wherein the output means comprises a vibration generation device, and wherein the sensory signal comprises vibration generated by the vibration generation device.

* * * * *